United States Patent
Mastrianni et al.

(10) Patent No.: US 10,451,500 B2
(45) Date of Patent: Oct. 22, 2019

(54) FIBER OPTIC WEIGHT SENSOR OPTIMIZATION FOR LANDING GEAR

(71) Applicant: Sikorsky Aircraft Corporation, Stratford, CT (US)

(72) Inventors: Michael G. Mastrianni, Orange, CT (US); Payman Sadegh, Alpharetta, GA (US); Mark W. Davis, Southbury, CT (US); John H. Judge, Woodbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/536,300

(22) PCT Filed: Dec. 22, 2015

(86) PCT No.: PCT/US2015/067451
§ 371 (c)(1),
(2) Date: Jun. 15, 2017

(87) PCT Pub. No.: WO2016/106353
PCT Pub. Date: Jun. 30, 2016

(65) Prior Publication Data
US 2017/0370786 A1    Dec. 28, 2017

Related U.S. Application Data

(60) Provisional application No. 62/095,383, filed on Dec. 22, 2014.

(51) Int. Cl.
*G01L 1/00* (2006.01)
*G01L 1/26* (2006.01)
(Continued)

(52) U.S. Cl.
CPC .............. *G01L 1/26* (2013.01); *B64C 25/001* (2013.01); *B64D 45/00* (2013.01); *G01B 5/30* (2013.01);
(Continued)

(58) Field of Classification Search
CPC ........... G01L 1/26; G01L 1/242; G01B 11/16; G01B 5/30; G01M 11/083; B64D 2045/008; B64D 45/00; B64C 25/001
(Continued)

(56) References Cited

U.S. PATENT DOCUMENTS 5,421,204 A    6/1995 Svaty, Jr.
5,726,744 A    3/1998 Ferdinand et al.
(Continued)

FOREIGN PATENT DOCUMENTS

EP    2409916 A2    1/2012
EP    2441677 A2    4/2012
(Continued)

OTHER PUBLICATIONS

Notification of Transmittal of the International Search Report for Interantional Application No. PCT/US15/67451; International Filing Date: Dec. 22, 2015; dated Mar. 7, 2016; 8 pages.
(Continued)

*Primary Examiner* — Max H Noori
(74) *Attorney, Agent, or Firm* — Cantor Colburn LLP

(57) ABSTRACT

A measuring system and method that computes and analyzes sensor data fused with multiple mechanical and thermally induced strain measurements is provided. Further, the measuring system and method realizes physics-based relations between sensor readings due to mechanical and thermal sources by optimally de-coupling a total strain into its mechanical and thermal components. The measuring system and method also auto-tunes coefficients involved in the
(Continued)

optimal de-coupling equations using sensor specification data and previous system test results for initialization.

8 Claims, 4 Drawing Sheets

(51) Int. Cl.
    *G01B 11/16* (2006.01)
    *B64D 45/00* (2006.01)
    *G01B 5/30* (2006.01)
    *G01M 11/08* (2006.01)
    *B64C 25/00* (2006.01)
    *G01L 1/24* (2006.01)

(52) U.S. Cl.
    CPC ............. *G01B 11/16* (2013.01); *G01L 1/242* (2013.01); *G01M 11/083* (2013.01); *B64D 2045/008* (2013.01)

(58) Field of Classification Search
    USPC .................................................... 73/795, 796
    See application file for complete search history.

(56) References Cited

U.S. PATENT DOCUMENTS

| | | | |
|---|---|---|---|
| 6,415,242 B1 | 7/2002 | Weldon, Jr. et al. | |
| 6,676,075 B2* | 1/2004 | Cowan | B64D 45/00 244/1 R |
| 7,188,535 B1 | 3/2007 | Spletzer | |
| 7,973,914 B2 | 7/2011 | Omichi et al. | |
| 8,235,326 B2 | 8/2012 | Briancourt et al. | |
| 8,839,675 B2 | 9/2014 | Miller et al. | |
| 2008/0119967 A1* | 5/2008 | Long | G01G 19/07 701/3 |
| 2012/0012699 A1 | 1/2012 | Eriksen | |
| 2012/0046865 A1 | 2/2012 | Heisig et al. | |
| 2013/0340511 A1* | 12/2013 | Miller | G01G 19/07 73/65.05 |
| 2015/0316438 A1 | 11/2015 | Nance | |
| 2017/0322069 A1* | 11/2017 | Mastrianni | G01G 19/07 |

FOREIGN PATENT DOCUMENTS

| | | |
|---|---|---|
| JP | 1164119 A | 3/1999 |
| WO | 9618866 A1 | 6/1996 |
| WO | 2008110836 A1 | 9/2008 |
| WO | 2013038214 A2 | 3/2013 |

OTHER PUBLICATIONS

Written Opinion of the International Searching Authority for International Application No. PCT/US15/67451; International Filing Date: Dec. 22, 2015; dated Mar. 7, 2016; 6 pages.
Extended European Search Report for Application No./Patent No. 15874326.0-1010/3237833, dated May 16, 2018 (10 pp.).
International Preliminary Report on Patentability for International Application No. PCT/US2015/067451, dated Jun. 2017 (7 pp.).
Valis, Thomas et al., "Fiber-optic Fabry-Perot stain rosettes", Smart Materials and Structures, IOP Publishing Ltd, Bristol, GB, vol. 1, Jul. 30, 1992, No. 3 (6 pp.).

* cited by examiner

FIBER OPTIC WEIGHT SENSOR OPTIMIZATION FOR LANDING GEAR

CROSS REFERENCE TO RELATED APPLICATIONS

This application is a National Stage application of PCT/US2015/067451, filed Dec. 22, 2015, which claims the benefit of U.S. Provisional Application No. 62/095,383, filed Dec. 22, 2014, both of which are incorporated by reference in their entirety herein.

BACKGROUND

The disclosure relates generally to measuring landing gear loads and calculating aircraft gross weight using fiber optic sensors on landing gear, and more specifically, to de-coupling multiple mechanical and thermally induced strain measurements into their mechanical and thermal components to accurately measure a load on the landing gear.

In general, fiber optic sensors bond to a mechanical structure to sense a total strain by measuring a shift in wavelength of reflected light caused by mechanical strain in the mechanical structure. The total strain is composed of a mechanical strain (load) and a thermally induced strain. For example, when measuring a load in an landing gear, the changes in altitude subject the landing gear to thermally induced strain caused by changes in temperature at different altitudes. To accurately measure the load, the mechanical and thermally induced strain must be isolated from each other.

Current methodologies do not differentiate well between these two strains, especially in changing thermal conditions (e.g., which is the case when an aircraft descends for landing). Further, present thermal compensation can be affected by thermal sensor accuracy, geometry, and thermal bulk of the mechanical structure.

SUMMARY

According to one embodiment of the present invention, a computing device for computing a mechanical strain, communicatively coupled to a sensor sub-system that is physically coupled to a mechanical structure, is configured to receive a plurality of physical characteristics from the sensor sub-system that includes a first total strain detected by a first sensor oriented in a first direction and a second total strain detected by a second sensor oriented in a second direction; de-couple each of the first and second total strain into isolated first and second strain components; and compute the mechanical strain applied to the mechanical structure based on the isolated first and second strain components.

In the above embodiment, or in the alternative, the plurality of physical characteristics can include a temperature characteristic of the mechanical structure detected by a third sensor of the sensor sub-system, and the computation of the mechanical strain can incorporate the temperature characteristic.

In the above embodiment, or in the alternative, the orientation of the first sensor can be perpendicular to the orientation of the second sensor.

In the above embodiment, or in the alternative, the sensor sub-system can include a plurality of sensor pairs, one of which includes the first and second sensor, and a third sensor configured to detect a temperature characteristic of the mechanical device.

In the above embodiment, or in the alternative, the mechanical structure can include a landing gear assembly of an aircraft, and the sensor sub-system can be physically coupled to a trunnion portion of the landing gear assembly.

A measuring system can comprise the computing device and the sensor sub-system of any of the embodiments above.

According to one embodiment of the present invention, a method for computing a mechanical strain of a mechanical structure comprises receiving, by a computing device communicatively coupled to a sensor sub-system that is physically coupled to a mechanical structure, a plurality of physical characteristics from the sensor sub-system that includes a first total strain detected by a first sensor oriented in a first direction and a second total strain detected by a second sensor oriented in a second direction; de-coupling, by the computing device, each of the first and second total strain into isolated first and second strain components; and computing, by the computing device, the mechanical strain applied to the mechanical structure based on the isolated first and second strain components.

In the above embodiment, or in the alternative, the plurality of physical characteristics can include a temperature characteristic of the mechanical device detected by a third sensor of the sensor sub-system, and the computing of the mechanical strain can incorporate the temperature characteristic.

In the above embodiment, or in the alternative, the orientation of the first sensor can be perpendicular to the orientation of the second sensor.

In the above embodiment, or in the alternative, the sensor sub-system can include a plurality of sensor pairs, one of which includes the first and second sensor, and third sensor configured to detect a temperature characteristic of the mechanical device.

In the above embodiment, or in the alternative, the mechanical structure can be a landing gear assembly of an aircraft, and the sensor sub-system can be physically coupled to a trunnion portion of the landing gear assembly.

In the above embodiment, or in the alternative, the computing device decouples of each of the first and second total strain using a plurality of decoupling equations. A coefficient of the de-coupling equations is refined based on at least one of sensor specification data and previous system test results during initialization.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, current methodologies do not differentiate well between the components of a total strain on a mechanical structure and present thermal compensation is affected by thermal sensor accuracy, geometry, and thermal bulk of the mechanical structure. Thus, what is needed is a system, method, and/or computer program product configured to optimally de-couple multiple mechanical and thermally induced strain measurements into their mechanical and thermal components to accurately measure a load on the landing gear.

In general, embodiments of the present invention disclosed herein may include a measuring system, method, and/or computer program product that computes and analyzes sensor data fused with multiple mechanical and thermally induced strain measurements. That is, the measuring system, methodologies, and/or computer program product realizes physics-based relations between sensor readings due to mechanical and thermal sources by optimally de-coupling a total strain into its mechanical and thermal components. The measuring system, method, and/or computer program product further auto-tunes or refines the coefficients involved in the optimal de-coupling equations based on sensor specification data and previous system test results during initialization.

Figure 1:
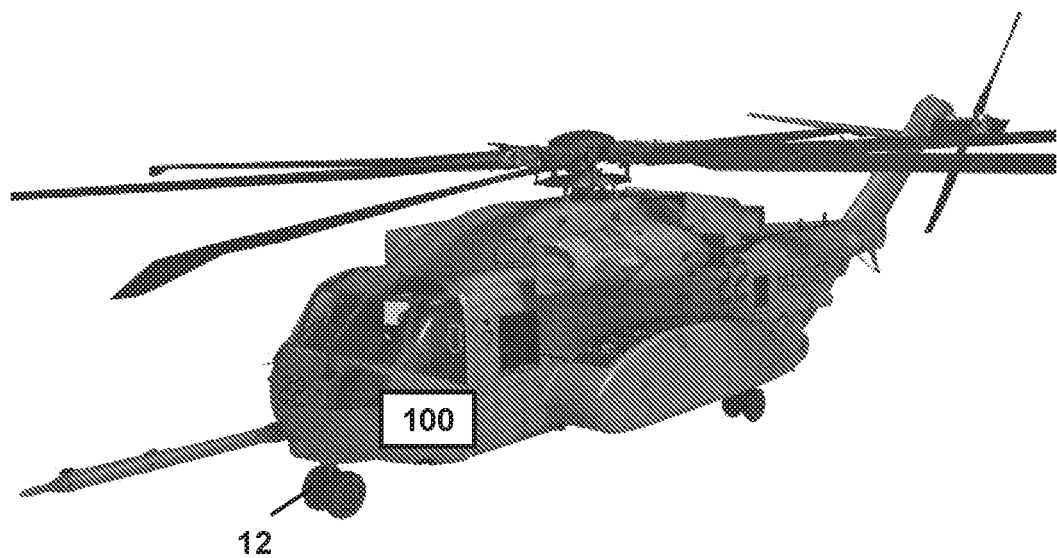
FIG. 1 illustrates a vehicle environment for employing a measuring system.

FIG. 1 illustrates a vehicle environment (e.g., a rotary wing aircraft 10) having a main rotor system. The aircraft 10 includes an airframe having an extending tail which mounts a tail rotor system, such as an anti-torque system. The main rotor assembly is driven through a main power transmission gearbox by one or more engines. The aircraft 10 employs at least one landing gear assembly 12 during a landing procedure and while performing land-based maneuvers on a ground surface. The aircraft further incorporates a measuring system 100 for performing a measuring process of the strain on the landing assembly 12. Although a particular rotary wing aircraft 10 configuration is illustrated and described in the disclosed embodiment, other vehicle environments, configurations, and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, and the like may also benefit from the embodiments described herein.

The landing gear assembly 12 is configured to transition between various conditions, including what is referred to herein as an extended condition and a compressed condition. The extreme extended and compressed conditions will vary depending on the particular application and upon the forces applied to the landing gear assembly 12.

The measuring system 100, which can be integral to the rotary-wing aircraft 10, reliably and automatically measures and displays gross weight and center of gravity via software algorithm and sensor orientation scheme with a calibration procedure. In contrast, current vehicle environments determine gross weight and center of gravity calculations by use of external scales or manual calculations based on a predetermined empty weight and a calculated load from fuel, passengers, and cargo. Thus, the measuring system 100 comprises a sensor sub-system that includes at least one pair of strain sensors, where each sensor of the pair is employed in a different orientation so that different directional forces may be detected and output. The outputs of the at least one pair of strain sensors are further received and processed by a computing device of the measuring system 100, which is in communication with the sensor sub-system, that utilizes one or more algorithms to solve for mechanical strain on the landing gear assembly 12 (e.g., while accounting for each sensor's orientation).

Figure 2:
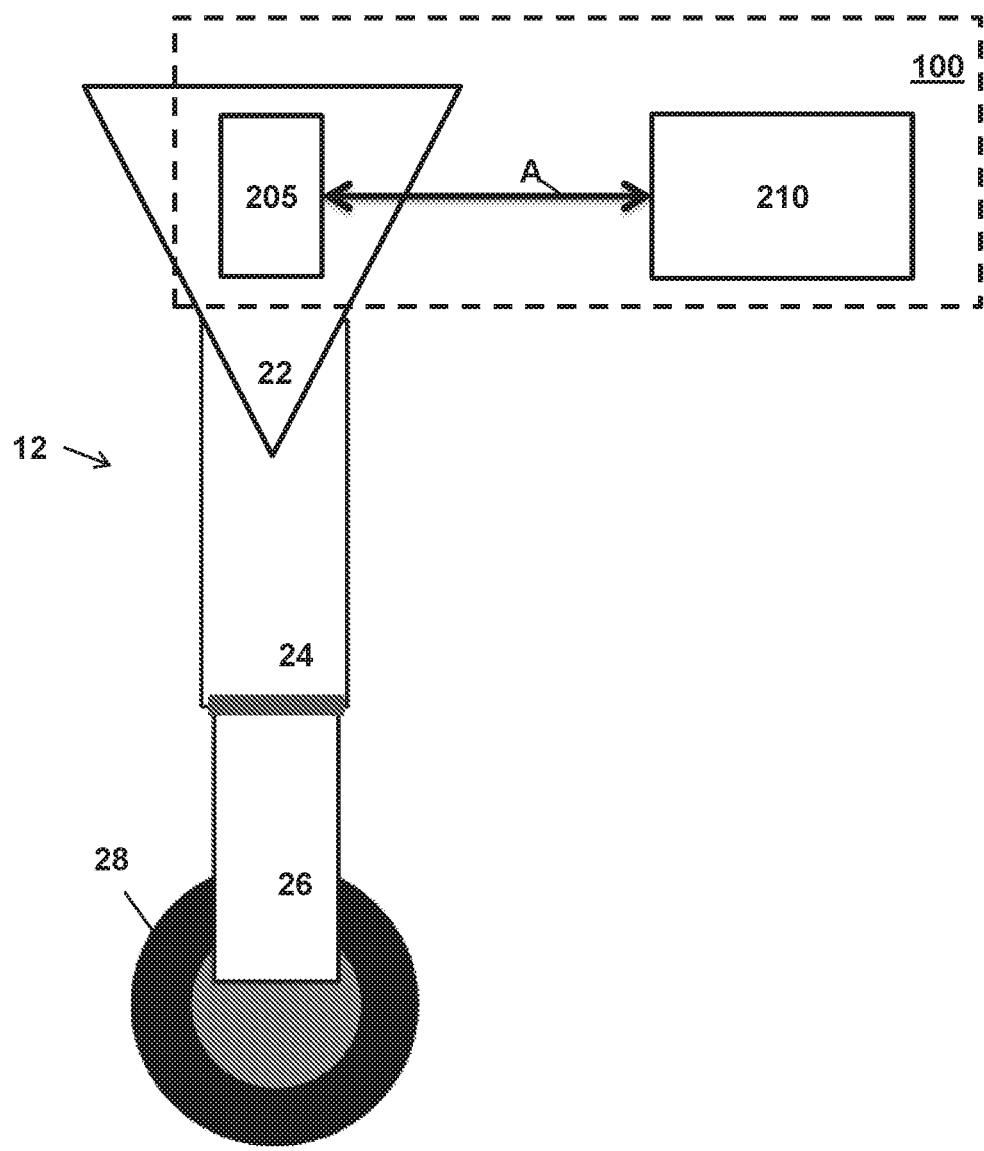
FIG. 2 illustrates a measuring system.

The vehicle environment and elements therein of the Figures may take many different forms and include multiple and/or alternate components and facilities. That is, while a rotary-wing aircraft 10 is shown in FIG. 1, the components illustrated in FIG. 1 and other Figures are not intended to be limiting. Indeed, additional or alternative components and/or implementations may be used. The landing gear assembly 12 and the measuring system 100 are schematically illustrated in greater detail with respect to FIG. 2.

The landing gear assembly 12 includes a trunnion 22 and a cylinder 24 that is directly or indirectly coupled to the aircraft 10 in a relatively stationary manner. The trunnion 22 is a protrusion from the landing gear assembly 12 utilized as a mounting and/or pivoting point for the cylinder 24. The cylinder 24 has an outer cylinder surface, which the trunnion 22 is coupled to, and an inner cylinder surface, with the inner cylinder surface defining an interior chamber of the cylinder 24. Although referenced as a cylinder 24 herein, it can be appreciated that alternate shapes and geometric configurations may be employed, as long as the interior chamber is present. A piston 26 is directly or indirectly coupled to a wheel 28 of the landing gear assembly 12 and is configured to translate relative to the cylinder 24 upon the application of a force to the wheel 28. Specifically, the piston 26 is in sliding disposition with the cylinder 24 such that a portion of the piston 26 telescopes within the interior chamber of the cylinder 24.

During calibration of the landing gear assembly 12, it is advantageous to acquire gross weight and center of gravity by the measuring system 100 of the aircraft 10, such as monitoring the strains on the trunnion 22 and/or monitoring movement of the piston 26 relative to other components of the landing gear assembly, such as the cylinder 24, for example. The data obtained by the measuring system 100 during monitoring of the strains on the trunnion 22 and/or movement of the piston 26 provides diagnostic information about various components of the landing gear assembly 12, such as shocks and struts that are employed on the landing gear assembly 12 to dampen forces associated with a landing of the aircraft 10, thereby reducing oscillations caused by such forces.

The measuring system 100, as represented by dashed-box, comprises a sensor sub-system 205 and a computing device 210 that are communicatively coupled, as represented by Arrow A, and that are incorporated with or external to each other. The measuring system 100, the sensor sub-system 205, and the computing device 210 may include and/or employ any number and combination of sensors, computing devices, and networks utilizing various communication technologies, as described below, that enable the measuring system 100 to perform the measuring process, as further described with respect to FIG. 4. The sensor sub-system 205 includes at least one pair of sensors (e.g., sensors 306, 307) that is operatively coupled to the landing gear assembly 12 (e.g., the trunnion 22). The sensor sub-system 205 may also include at least one third sensor 308 in addition to the at least one pair of sensors. The precise location of each sensor 306, 307, 308 may vary. The sensors 306, 307, 308 are converters that measure physical quantities and converts these physical quantities into a signal that is read by the computing system 210. In one embodiment, the sensors 306, 307 are strain gauges that measure the physical stress applied to the landing gear assembly 12. Examples of strain gauges include fiber optic gauges, foil gauges, capacitive gauges, etc. In another embodiment, the third sensor 308 is a temperature sensor that measures the temperature characteristics and/or the physical change in temperature of the landing gear assembly 12. Examples of temperature sensor include fiber optic nano temperature sensor, heat meter, infrared thermometer, liquid crystal thermometer, resistance thermometer, temperature strip, thermistor, thermocouple, and the like. In one embodiment, the sensors 306, 307, 308 are operatively coupled to the trunnion 22 proximate the cylinder 24. In another embodiment, the sensors 306, 307, 308 are operatively coupled to the inner cylinder surface within the interior chamber of the cylinder 24. In any of the embodiments, the sensors 306, 307, 308 may be located within a housing to provide protection for the sensors 306, 307, 308 from materials that may cause structural damage to the sensors 306, 307, 308 (e.g., or that may occlude the optical capabilities of the sensors 306, 307). Furthermore, a plurality of pairs of sensors 306, 307 and/or the third sensor 308 may be located in a circumferentially spaced manner around the trunnion 22, the cylinder 24, or within the interior chamber of the cylinder 24. It should be understood to a person having ordinary skill that the pairs of sensors 306, 307 may be positioned at any location on the structure where there is a mechanical strain vector that is parallel to one of the sensors 306, 307.

In one embodiment, the sensors 306, 307 are fiber optic sensors that detect the manifestation of a total strain on the aircraft 10 by measuring a shift in wavelength of reflected light. For accuracy, the contribution from mechanical strain and thermally induced strains are isolated by the computing device 210 so that a measurement for a strict mechanical load is used to measure a gross weight and/or a center of gravity. The computing device 210 utilizes a measurement algorithm to isolate the differences in the physical properties of mechanical and thermally induced strains in two directions from the total strain on the aircraft detected by the sensors 306, 307. Mechanical strain is a vector force and causes compression (MY) in the landing gear in the direction of the force. Further, in a perpendicular direction to the force (MX), mechanical strain will cause expansion of the material in proportion to Poisson's Ratio. Thermal load causes strain proportionally to the coefficient of thermal expansion to be spread in all directions (TX, TY). Utilizing the directional distinctions, the measurement algorithm solves simultaneously two separate equations, one for mechanical strains and one for thermally induced strains, to decouple from the total strain an isolated mechanical strain.

Figure 3:
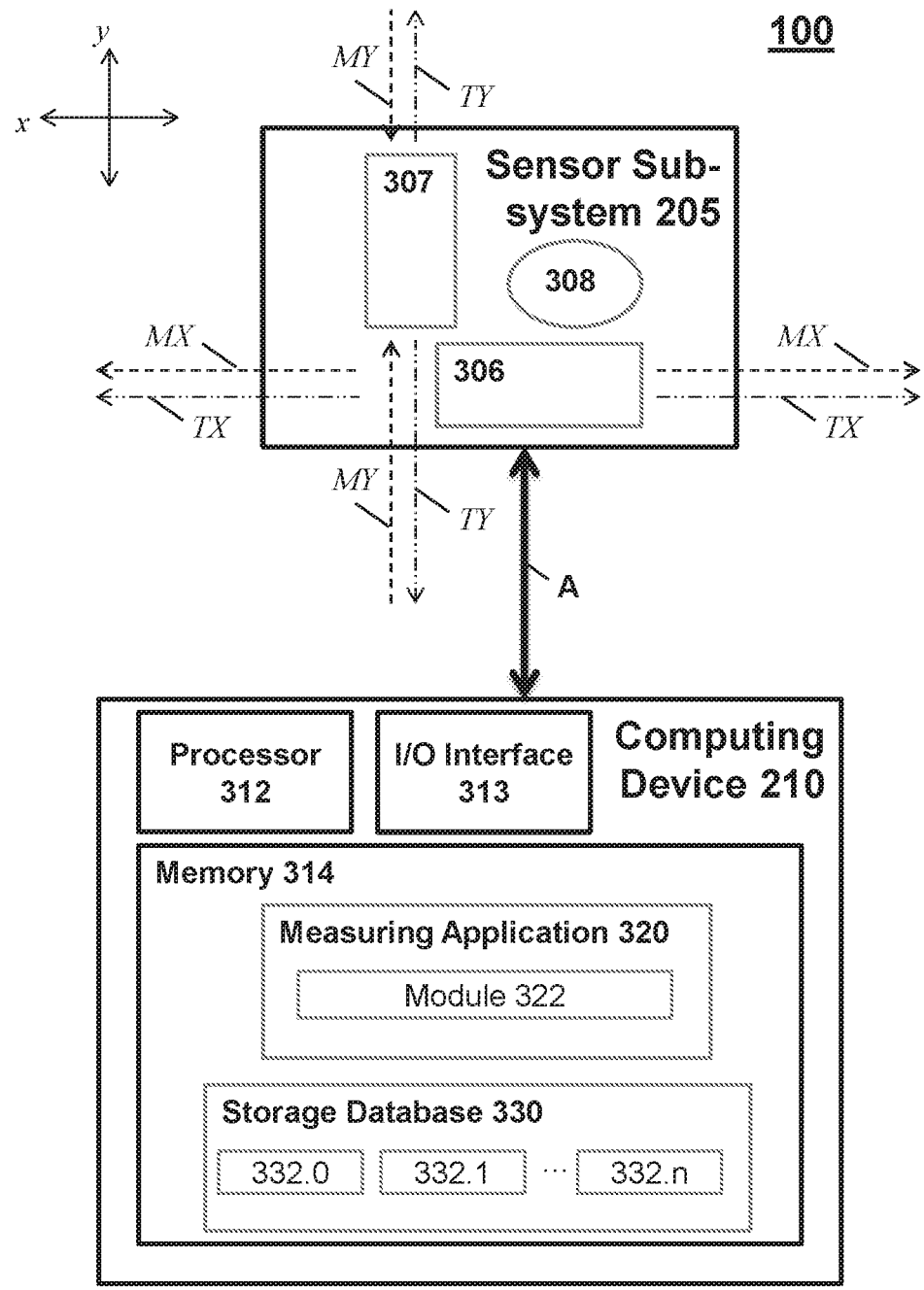
FIG. 3 illustrates a sensor sub-system and computing device schematic configured to provide a measuring process.

For example, as illustrated in FIG. 3, a sensor orientation of sensor 306 to sensor 307 (e.g., two fiber optic strain gauges mounted to the trunnion 22) is perpendicular, the sensor 306 is placed along first direction (x) while the sensor 307 is placed along a second direction (y) that is perpendicular to the first direction. Both sensors 306, 307 are bonded, meaning that mechanical expansion along the 'x' axis will cause a contraction along 'y' (and vice versa), with the ratio of the expansion to contraction equal to the Poisson Ratio (e.g., ~0.33 for Aluminum). Thermally induced strain on the other hand affects the sensors 306, 307 similarly (i.e. expansion or contraction in both directions).

Irrespective of the precise location, the sensors 306, 307 are positioned in different orientations so that different direction forces may be detected and a code pattern based on those different directional forces may be output. The code pattern may be any transmission by any medium that is capable of being optically detected by the computing device 210 during movement (e.g., translation, rotation, etc.) of the landing gear assembly 12. In one example, the code pattern is a binary-coded pattern that contains two bits, with the computing device 210 configured to detect the scanned bit along various portions of the pattern. It is contemplated that code patterns having additional bits may be employed. Additionally, the coded-pattern may be in the form of gray codes that comprise a binary numeral system where two successive values differ in only one bit (binary digit). Regardless of the precise type of code employed as the pattern, the sensors 306, 307, 308 are configured to detect the direction forces and output a resulting code pattern (e.g., detected data) detectable by a computing device 210.

As noted above, it is to be appreciated that the computing device 210 is schematically depicted and the location of the computing device 210 may vary. In particular, the computing device 210 may be integrated within the sensor sub-system 205 or may be disposed at a remote location in a wired or wireless communicative state with the sensor sub-system 205.

The computing device 210 may include a processor 312, input/output (I/O) interface 313, and a memory 314. The memory 314 may further store a measuring application 320, which includes a module 322, and/or a storage database 330, which includes data 332.

The computing device 210 (e.g., a computing device as described below) is configured to provide a measuring process, where the processor 312 may receive computer readable program instructions from the measuring application 320 of the memory 314 and execute these instructions, thereby performing one or more processes defined by the measuring application 320. Also, the computing device 100 may utilize the storage database 330 to archive and store detected data received from the sensor sub-system and/or data computed by the measuring application 320, as data 332.

The processor 312 may include any processing hardware, software, or combination of hardware and software utilized by the computing device 210 that carries out the computer readable program instructions by performing arithmetical, logical, and/or input/output operations. Examples of the processor 312 include, but are not limited to an arithmetic logic unit, which performs arithmetic and logical operations; a control unit, which extracts, decodes, and executes instructions from a memory; and an array unit, which utilizes multiple parallel computing elements.

The I/O interface 313 may include a physical and/or virtual mechanism utilized by the computing device 210 to communicate between elements internal and/or external to the computing device 210. That is, the I/O interface 313 may be configured to receive or send signals or data within or for the computing device 210. An example of the I/O interface 313 may include a network adapter card or network interface configured to receive computer readable program instructions from a network and forward the computer readable program instructions, original records, or the like for storage in a computer readable storage medium (e.g., memory 314) within the respective computing/processing device (e.g., computing device 210).

The memory 314 may include a tangible device that retains and stores computer readable program instructions, as provided by the measuring application 320, for use by the processor 312 of the computing device 210.

The measuring application 320 ("application 320") comprises computer readable program instructions configured to receive and respond to detected data from the sensor sub-system 205 and/or user inputs instructing the application 320 to operate in a particular manner. The application 320 includes and is configured to utilize a module 322 to perform measurement and self-calibrating algorithms during no load and other situations to decouple a total strain of the aircraft 10. The module 322 comprises computer readable program instructions configured to execute Equations 1-13, further described below.

The module 322 describes the mechanical and thermally induced strains in the X and Y direction by utilizing Equations 1a, 1b, where dS, dF denote change in strain and corresponding change in fiber optics sensor response (as measured in strain units) and X and Y denote the x and y directions and indices denote mechanical and thermal respectively.

$$dF_X = dS_{MX} + dS_{TX} + d\varepsilon_X \quad \text{Equation 1a}$$

$$dF_Y = dS_{MY} + dS_{TY} + d\varepsilon_Y \quad \text{Equation 1b}$$

Further, the error terms $d\varepsilon_X$, $d\varepsilon_Y$ capture all unaccounted factors and other sources of random variability. Next, Poisson law is utilized in Equation 2, where a Poisson ratio ($\lambda$) is employed based on the material at which the sensor sub-system 205 is attached (e.g., ~0.33 for aluminum). Then, in Equation 3, $\alpha$ denotes the ratio of thermally induced strains affecting the sensor response in x and y directions respectively.

$$dS_{MY} = -\lambda dS_{MX} \quad \text{Equation 2}$$

$$dS_{TX} = \alpha dS_{TY} \quad \text{Equation 3}$$

While the above ratio $\alpha$ should be close to 1, based on factors related to non-identical sensor manufacturing and trunnion different geometry in the x and y directions, the value of $\alpha$ may vary.

Using temperature chamber data under no load/variable temperature conditions $\alpha$ was estimated around 1.28. It is further assumed that the change in thermally induced strain is proportional to temperature, as shown in Equation 4 where T denotes temperature (e.g., measured in degrees Fahrenheit). Notice that $\kappa$ is essentially a factor that converts degrees Fahrenheit to strain units (e.g., µstrain). Its value has been found to be 7.99 using temperature chamber data.

$$dS_{TY} = \kappa dT \quad \text{Equation 4}$$

Next, it is assumed that the errors in the x and y directions (e.g., $d\varepsilon_X$, $d\varepsilon_Y$) are zero mean normal random variables with the same variance (e.g., intensity), as shown in Equation 5.

$$dS_{TY} = \kappa dT \quad \text{Equation 5}$$

Then, inserting Equation 2, Equation 3, and Equation 4 in Equation 1 yields Equations 6a, 6b, which provides two simultaneous equations that relate the sensor measurements in the x and y directions to the mechanical strain affecting the x direction and temperature. These equations can be combined into Equation 7, via the linear combination, where w is the linear weight on the 'y' equation.

$$dF_X = dS_{MX} + \kappa \alpha dT + d\varepsilon_X \quad \text{Equation 6a}$$

$$dF_Y = -\lambda dS_{MX} + \kappa dT + d\varepsilon_Y \quad \text{Equation 6b}$$

$$dF_X + w dF_Y = (1 - \lambda w) dS_{MX} + \kappa(\alpha + w) dT + d\varepsilon, d\varepsilon \sim N(0, \sigma^2 + \sigma^2 w^2) \quad \text{Equation 7}$$

Two special cases for Equation 7 are derived by setting different values for w. In one case, w is set so as to eliminate temperature. In another case, w is computed so as to maximize the signal to noise ratio for estimation of the mechanical strain.

In the one case, the module 320 operates to eliminate the effect of temperature by setting w=−α. The combined equation then reduces to Equation 8 and the gross weight (e.g., GW) prediction equation can then be derived as Equation 9, where the calibration coefficient $k_1$ converts load distributed on the trunnion (e.g., µstrain) to the aircraft weight (e.g., lbs) and $k_0$ sets the no load baseline. $k_1$, $k_0$ may be estimated via calibration experiments where the landing gear is subjected for the measuring system 100. A scale may be used to measure the weight of the aircraft during calibration.

$$dF_X - \alpha dF_Y = (1 + \lambda \alpha) dS_{MX} + d\varepsilon \quad \text{Equation 8}$$

$$GW(\text{lbs}) = \frac{k_1}{1 + \lambda \alpha}(F_X - \alpha F_Y) + k_0 \quad \text{Equation 9}$$

In the one case, the module 320 operates an optimal equation weighting, where w is calculated such that the signal to noise ratio for estimation of the mechanical strain (e.g., Equation 10) is maximized for any given change in the mechanical strain and noise variance. Differentiating the signal to noise ratio and solving for the zero of the derivative with respect to (e.g., Equation 10), the optimum Equation 10 is produced. Then, for example, setting the Poisson ratio for Aluminum in Equation 10 yields the optimum w*=−0.37. Next, the load prediction equation can now be written as Equation 11, where $k_1$, $k_0$ are calibration coefficients similar to that of Equation 9. Note that except for calibration coefficients $k_1$, $k_0$ that can be obtained from tests involving aircraft measurement on a scale subject to various applied loads, all the other parameters may be set without the need for detailed experimentation. For example as shown earlier w* is only a function of the trunnion material (e.g., Poisson ratio). The temperature-strain conversion factor $\kappa$ and the ratio $\alpha$ shall be estimated using data under no load conditions. Their values can be initialized using vendor specification data or previous system tests.

$$\left(\frac{1 - \lambda w}{1 + w^2}\right)\left(\frac{dS_{MX}}{\sigma}\right) \quad \text{Equation 10}$$

$$w^* = \frac{\lambda}{1 - \lambda^2} \quad \text{Equation 11}$$

$$GW(\text{lbs}) = k_1(1 - \lambda^2)\left[F_X - \frac{\lambda}{1-\lambda^2}F_Y - \kappa\left(\alpha - \frac{\lambda}{1-\lambda^2}\right)T\right] + k_0 \quad \text{Equation 12}$$

Using the initial values $\alpha$=1.28, $\kappa$=7.99, and $\lambda$=0.33, we can summarize the two case formulations as shown in Equations 13a and 13b.

$$GW(\text{lbs}) = \frac{k_1}{1.42}[F_X - 1.28 \times F_Y] + k_0 \quad \text{Equation 13a}$$

$$GW(\text{lbs}) = \frac{k_1}{1.12}[F_X - 0.37 \times F_Y - 7.28 \times T] + k_0 \quad \text{Equation 13b}$$

While the effort involved in calibrating the above two cases, the latter case requires independent temperature measurements in addition to measurements of the strain in the x and y directions. Such measurements were provided in chamber experiments using a thermocouple installed on the trunnion. Since addition of independent temperature measurements (e.g., as analysis of experimental results show) has a significant impact on reduction of errors (e.g., ~100 lbs.), a more practical alternative to the use of thermocouple in production may be the addition of an un-bonded fiber sensor to the existing sensor sub-system 205 (e.g., sensor 308).

The load predicted by Equations 13a, 13b (e.g., using each above case formulations) is most sensitive to the estimated value of α. Although a good initial estimate of may be obtained using vendor's specification data or previous system tests, even slight changes can lead to increased error (e.g., 1% change in the assumed value of this ratio may lead to around 150 lbs. increase in the worst case error). As a result further tuning and optimization of α is warranted. Fortunately, optimization of α utilizes no load-varying temperature data, which is data the measuring system 100 can acquire during flight operations of the aircraft 10. Such data is then used to improve the estimate of a using self-tuning algorithms, whereby the measuring system 100 observes the ratio of changes in sensor strains as temperature varies. To obtain a reliable estimate of α, the measuring system 100 compensates for the impact of onboard vibration and other nuisance strains.

While single items are illustrated for the application 320 (and other items by each Figure), these representations are not intended to be limiting and thus, the application 320 items may represent a plurality of applications. For example, multiple measuring applications in different locations may be utilized to access the collected information, and in turn those same applications may be used for on-demand data retrieval. In addition, although one modular breakdown of the application 320 is offered, it should be understood that the same operability may be provided using fewer, greater, or differently named modules. Although it is not specifically illustrated in the figures, the applications may further include a user interface module and an application programmable interface module; however, these modules may be integrated with any of the above named modules. A user interface module may include computer readable program instructions configured to generate and manage user interfaces that receive inputs and present outputs. An application programmable interface module may include computer readable program instructions configured to specify how other modules, applications, devices, and systems interact with each other.

The storage database 330 may include a database, such as the described above data repository or other data store and may include various kinds of mechanisms for storing, accessing, and retrieving various kinds of data, including a hierarchical database, a set of files in a file system, an application database in a proprietary format, a relational database management system (RDBMS), etc., capable of storing data 332. The storage database 330 is in communication with the application 320 of and/or applications external to the computing device 310, such that information, data structures, and documents including data 332 may be collected and archived in support of the processes described herein (e.g., mapping process). As illustrated in FIG. 3, the storage database 330 includes the data 332, illustrated as data 322.0 to data structure 332.n, where 'n' is an integer representing a number of structures archived by the storage database 330. Although one exemplary numbering sequence for the data 332 of the storage database 330 is offered, it should be understood that the same operability may be provided using fewer, greater, or differently implemented sequences. The storage database 330 may generally be included within the computing device 210 employing a computer operating system such as one of those mentioned above. The storage facility 330 may also run independently of the computing device 210 and in communication with the application 320 and the sensor sub-system 205 via a network in any one or more of a variety of manners. In operation, for example, the storage database 330 may collect and archive the data 332 received from the application 320 and the sensor sub-system 205. The storage database 330 may further communicate with other systems that may be internal or external to the measuring system 100 to collect and archive data 332. The information may be any collection of data stored in a data structure. A data structure (e.g., the individual instances of the data 332) is a mechanism of electronically storing and organizing information and/or managing large amounts of information. Thus, the data 332 are illustrative of sensor outputs, calculation outputs, and historical information that are stored for use by the application 320. Examples of data structure types include, but are not limited to, arrays, which store a number of elements in a specific order; records, which are values that contains other values; hash tables, which are dictionaries in which name-value pairs can be added and deleted; sets, which are abstract data structures that store specific values without any particular order and repeated values; graphs and trees, which are linked abstract data structures composed of nodes, where each node contains a value and also one or more pointers to other nodes; and objects, which contain data fields and program code fragments for accessing or modifying those fields.

Figure 4:
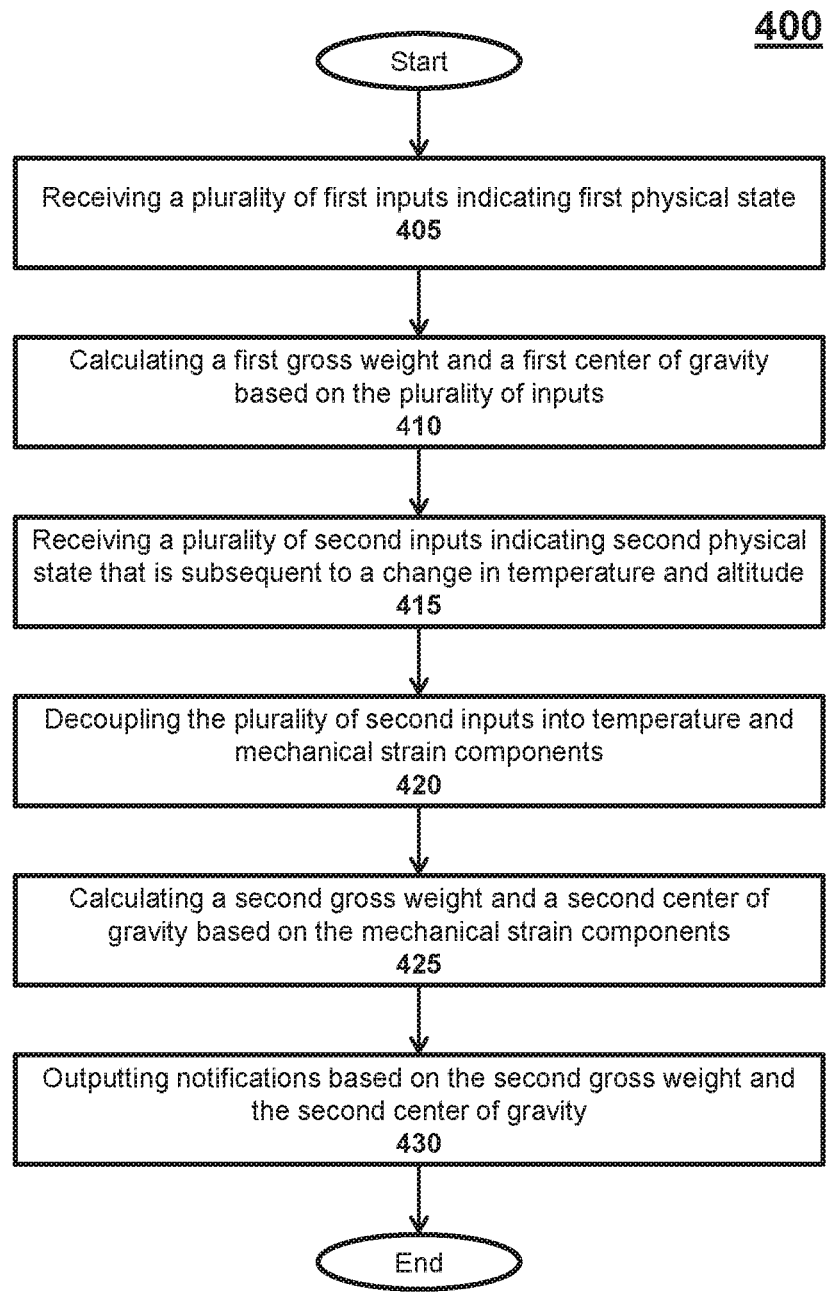
FIG. 4 illustrates a process flow of a measuring system.

FIG. 4 illustrates a process flow 400 of a measuring system 100. The process 400 begins at block 405 when the application 210 receives a plurality of first inputs indicating a first physical state of the aircraft 210. The plurality of first inputs corresponds to output signals from the sensors 306, 307, 308 of the sensor sub-system 205. At block 410, the application 210 calculates a first gross weight and a first center of gravity based on the plurality of inputs.

Next, at block 415, the application receives a plurality of second inputs indicating a second physical state that is subsequent to a change in temperature and altitude. The plurality of second inputs also corresponds to output signals from the sensors 306, 307, 308 of the sensor sub-system 205. Then, at block 420, the application 210 decouples the plurality of second inputs into temperature and mechanical strain components utilizing the algorithm (and in turn the equations) of the module 322 described above.

The process 400 proceeds to block 425 where the application 210 calculates a second gross weight and a second center of gravity based on the mechanical strain components. Then, the process 400 proceeds to block 430 where the application 210 outputs notifications based on the second gross weight and the second center of gravity. The notifications, in general, are identifying information (or non-existence of the information) targeted to the systems or users responsible for the aircraft 10. Examples of notifications may include, but are not limited to, any combination of audio alerts (e.g., buzzers, bells, tones, telephone calls, cellphone calls, VoIP calls, voicemails, loudspeaker announcements, etc.), visual displays (e.g., flashing lights, display pop-ups), pager (e.g., SNPP), electronic mail (e.g., POP, IMAP, SMTP), desktop alerts (e.g., dialog, balloon, modal window, toast, etc.), instant messaging (e.g., IRC, ICQ, AIM, Yahoo! Messenger, MSN, XMPP, iMessage), text messaging (e.g., SMS), and the like. Then, the process 400 ends.

In view of the above, the systems, sub-systems, and/or computing devices, such as measuring system (e.g., sensor sub-system 205 and computing device 210 of FIG. 2), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, spectral measurement hardware or some other computing system and/or device.

Computing devices may include a processor (e.g., a processor 312 of FIG. 3) and a computer readable storage medium (e.g., a memory 314 of FIG. 3), where the processor receives computer readable program instructions, e.g., from the computer readable storage medium, and executes these instructions, thereby performing one or more processes, including one or more of the processes described herein (e.g., measuring process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, measuring system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of measuring system and method.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computing device for computing a mechanical strain, communicatively coupled to a sensor sub-system that is physically coupled to a landing gear assembly, the computing device configured to:
    receive a plurality of physical characteristics from the sensor sub-system physically coupled to a trunnion portion of the landing gear assembly, the physical characteristics including a first total strain detected by a first sensor oriented in a first direction and a second total strain detected by a second sensor oriented in a second direction, the orientation of the first sensor being perpendicular to the orientation of the second sensor;
    de-couple each of the first and second total strain into isolated first and second strain components;
    compute the mechanical strain applied to the mechanical structure based on the isolated first and second strain components; and
    output notifications via an input/output interface, the notifications being based on the mechanical strain.

2. The device of claim 1, wherein the plurality of physical characteristics includes a temperature characteristic of the mechanical device detected by a third sensor of the sensor sub-system, and
    wherein the computation of the mechanical strain incorporates the temperature characteristic.

3. The device of claim 1, wherein the sensor sub-system includes a plurality of sensor pairs, one of which includes the first and second sensor, and a third sensor configured to detect a temperature characteristic of the mechanical device.

4. A measuring system comprising the computing device and the sensor sub-system of claim 1.

5. A method for computing a mechanical strain of a landing gear assembly, comprising:
    receiving, by a computing device communicatively coupled to a sensor sub-system that is physically coupled to a trunnion portion of the landing gear assembly, a plurality of physical characteristics from the sensor sub-system that includes a first total strain detected by a first sensor oriented in a first direction and a second total strain detected by a second sensor oriented in a second direction, the orientation of the first sensor being perpendicular to the orientation of the second sensor;
    de-coupling, by the computing device, each of the first and second total strain into isolated first and second strain components;
    computing, by the computing device, the mechanical strain applied to the trunnion portion based on the isolated first and second strain components; and
    outputting notifications via an input/output interface, the notifications being based on the mechanical strain.

6. The method of claim 5, wherein the plurality of physical characteristics includes a temperature characteristic of the mechanical device detected by a third sensor of the sensor sub-system, and
    wherein the computing of the mechanical strain incorporates the temperature characteristic.

7. The method of claim 5, wherein the sensor sub-system includes a plurality of sensor pairs, one of which includes the first and second sensor, and a third sensor configured to detect a temperature characteristic of the mechanical device.

8. The method of claim 5, wherein the computing device decouples of each of the first and second total strain using a plurality of decoupling equations, wherein a coefficient of the de-coupling equations is refined based on at least one of sensor specification data and previous system test results during initialization.

* * * * *